US011083204B2

(12) United States Patent
Smith

(10) Patent No.: US 11,083,204 B2
(45) Date of Patent: Aug. 10, 2021

(54) PACKAGE FOR DOUGH PRODUCTS INCLUDING A COLLAPSIBLE BAKING PAD

(71) Applicant: WestRock Shared Services, LLC, Atlanta, GA (US)

(72) Inventor: Kenneth C. Smith, Marietta, GA (US)

(73) Assignee: WESTROCK SHARED SERVICES, LLC, Atlanta, GA (US)

(\*) Notice: Subject to any disclaimer, the term of this patent is extended or adjusted under 35 U.S.C. 154(b) by 183 days.

(21) Appl. No.: 16/122,143

(22) Filed: Sep. 5, 2018

(65) Prior Publication Data
US 2020/0068904 A1 Mar. 5, 2020

(51) Int. Cl.
| | | |
|---|---|---|
| *A21B 3/13* | (2006.01) | |
| *A21B 3/15* | (2006.01) | |
| *B65D 5/4805* | (2006.01) | |
| *B65D 71/26* | (2006.01) | |

(52) U.S. Cl.
CPC .......... *A21B 3/131* (2013.01); *A21B 3/15* (2013.01); *B65D 5/48022* (2013.01); *B65D 71/26* (2013.01); *B65D 2571/00339* (2013.01)

(58) Field of Classification Search
CPC ...... A21B 3/131; A21B 3/15; B65D 5/48022; B65D 71/26; B65D 2571/00339
See application file for complete search history.

(56) References Cited

U.S. PATENT DOCUMENTS

| | | | | |
|---|---|---|---|---|
| 1,345,711 | A * | 7/1920 | Shapiro ............. | B65D 5/48034 229/120.26 |
| 2,047,017 | A * | 7/1936 | Ellsworth .......... | B65D 5/48012 206/193 |
| 2,214,525 | A * | 9/1940 | De Murguiondo ....... | F25C 1/24 249/61 |
| 6,787,205 | B1 * | 9/2004 | Aho ....................... | B32B 27/10 428/34.2 |
| 2003/0047838 | A1 * | 3/2003 | Beale .................. | B29C 45/0001 264/328.1 |

\* cited by examiner

*Primary Examiner* — Andrew D Perreault
(74) *Attorney, Agent, or Firm* — John B. Swingle; Neil G. Cohen

(57) ABSTRACT

A package for raw dough products is disclosed that includes a tray defining an interior storage space, and a collapsible baking pad having an upper surface configured to support a plurality of raw dough products and adapted for movement between a nested condition dimensioned for placement within the interior storage space of the tray for shipping and a flattened condition separated from the tray for baking the raw dough products.

5 Claims, 14 Drawing Sheets

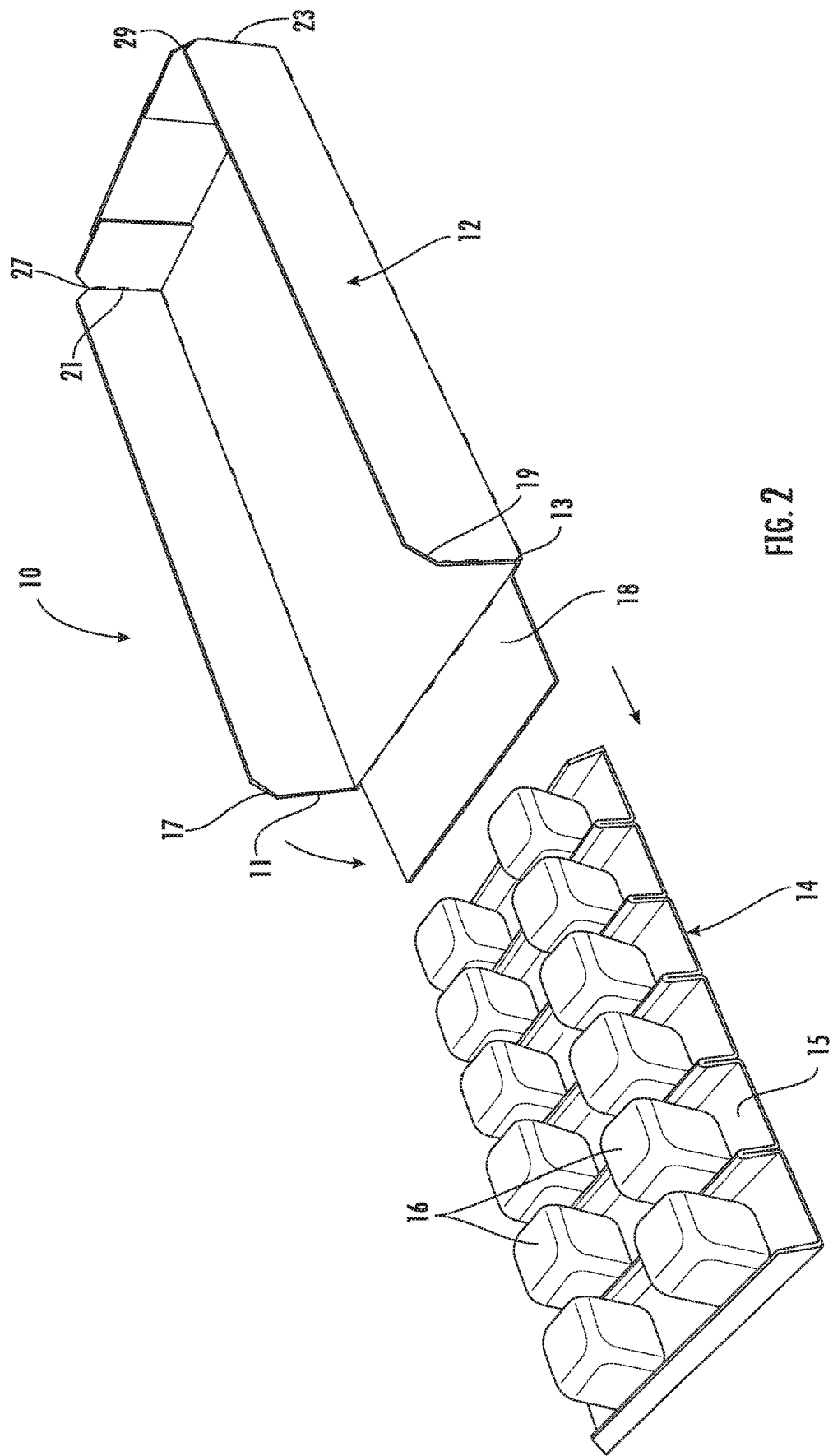

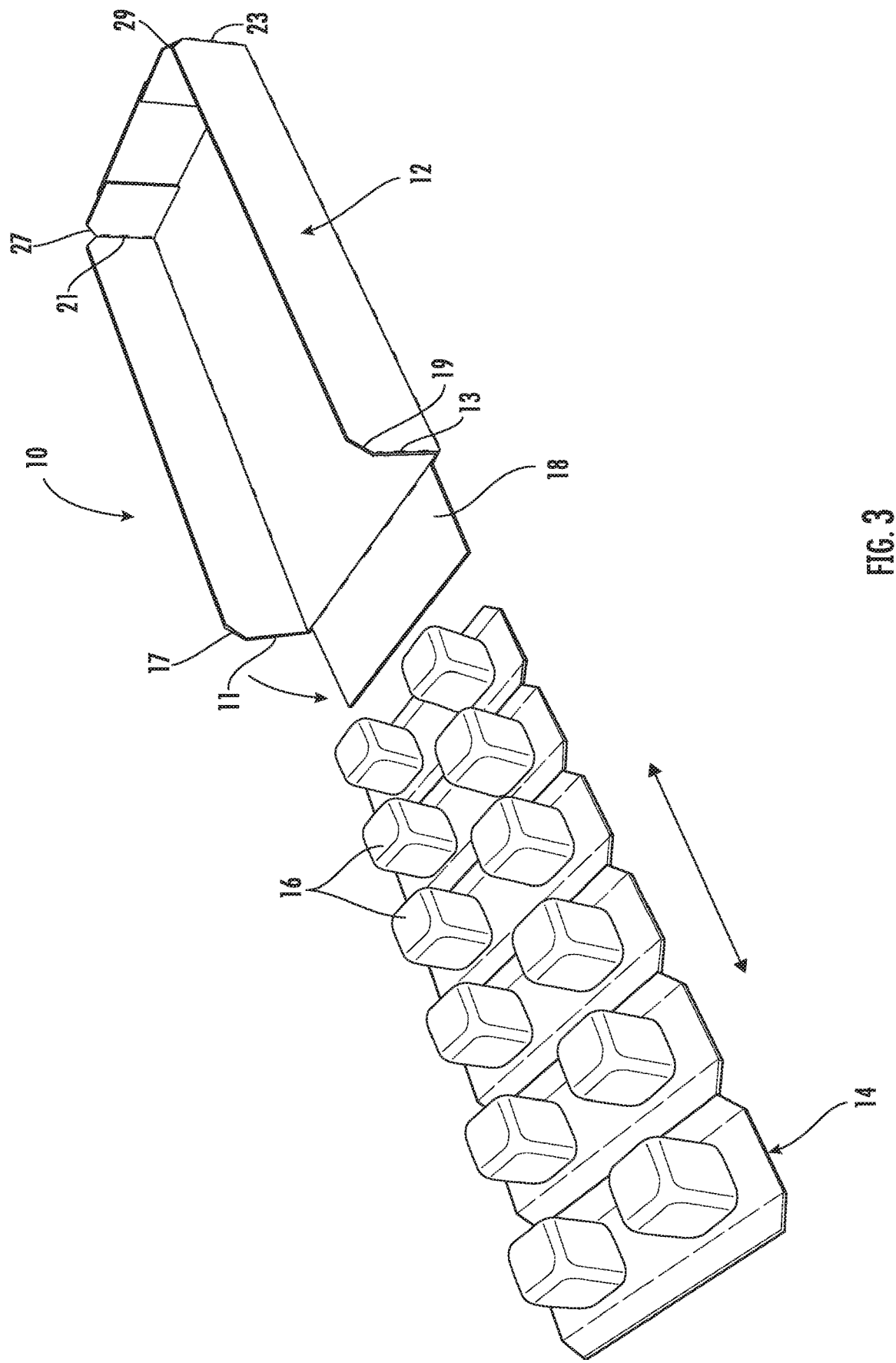

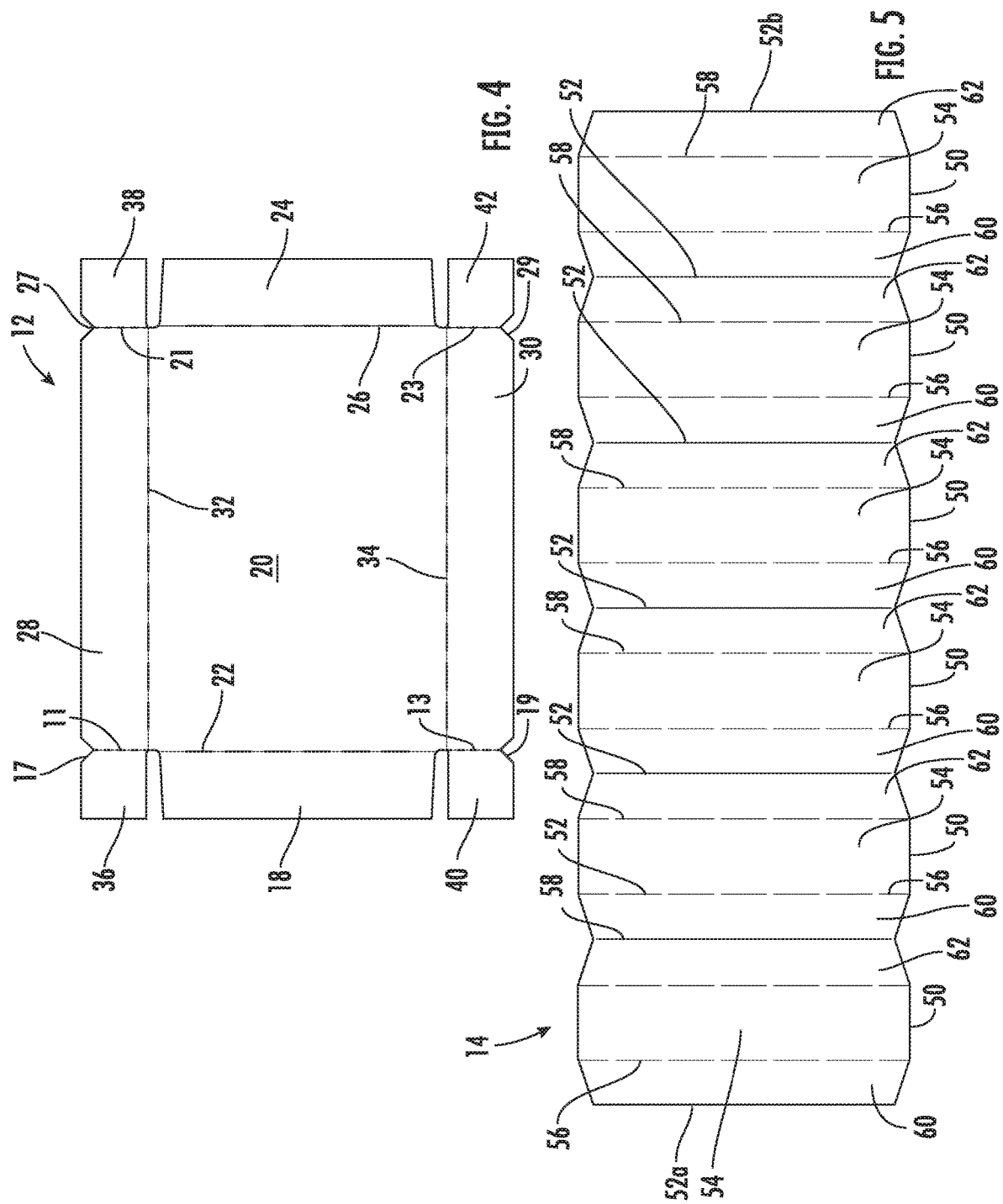

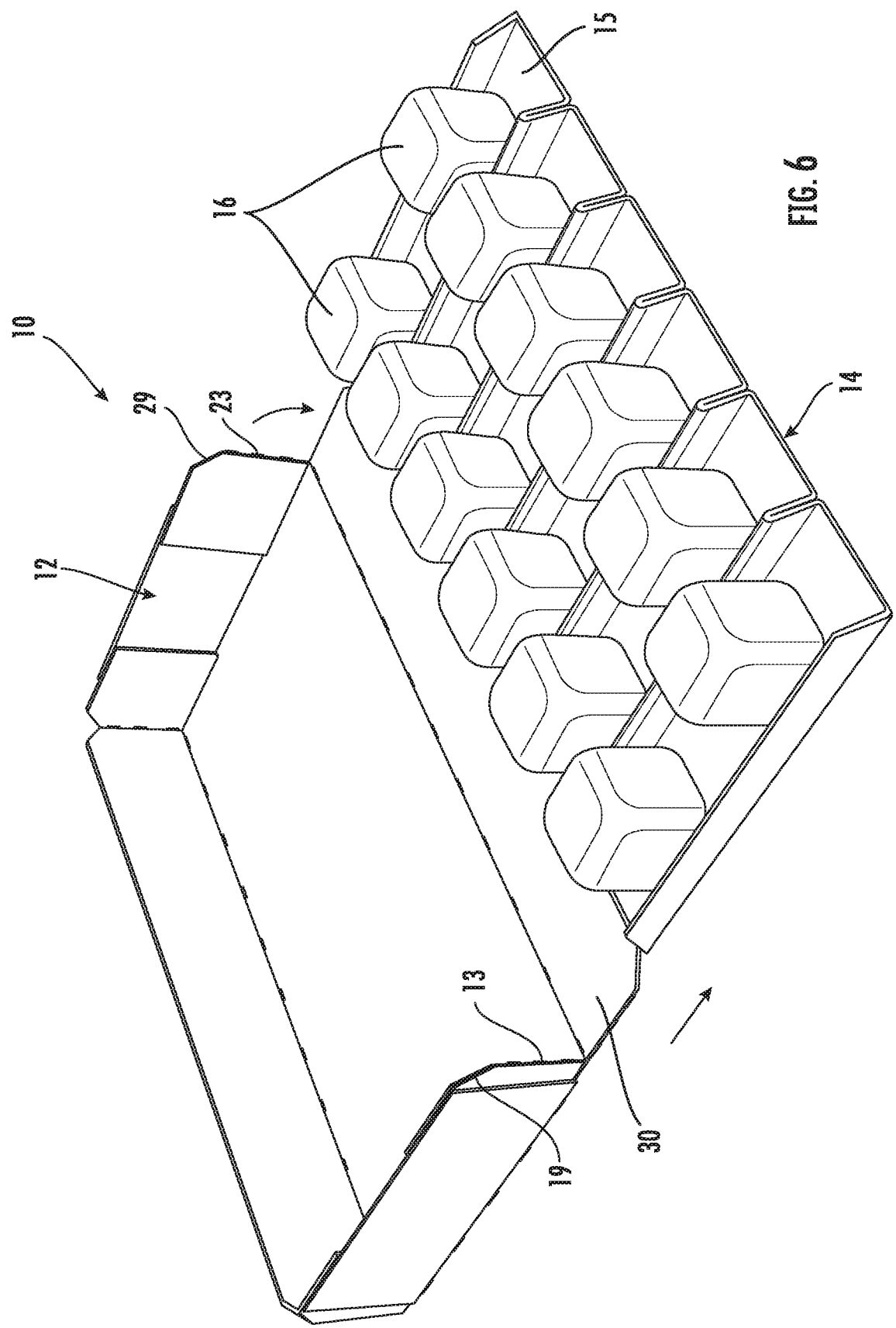

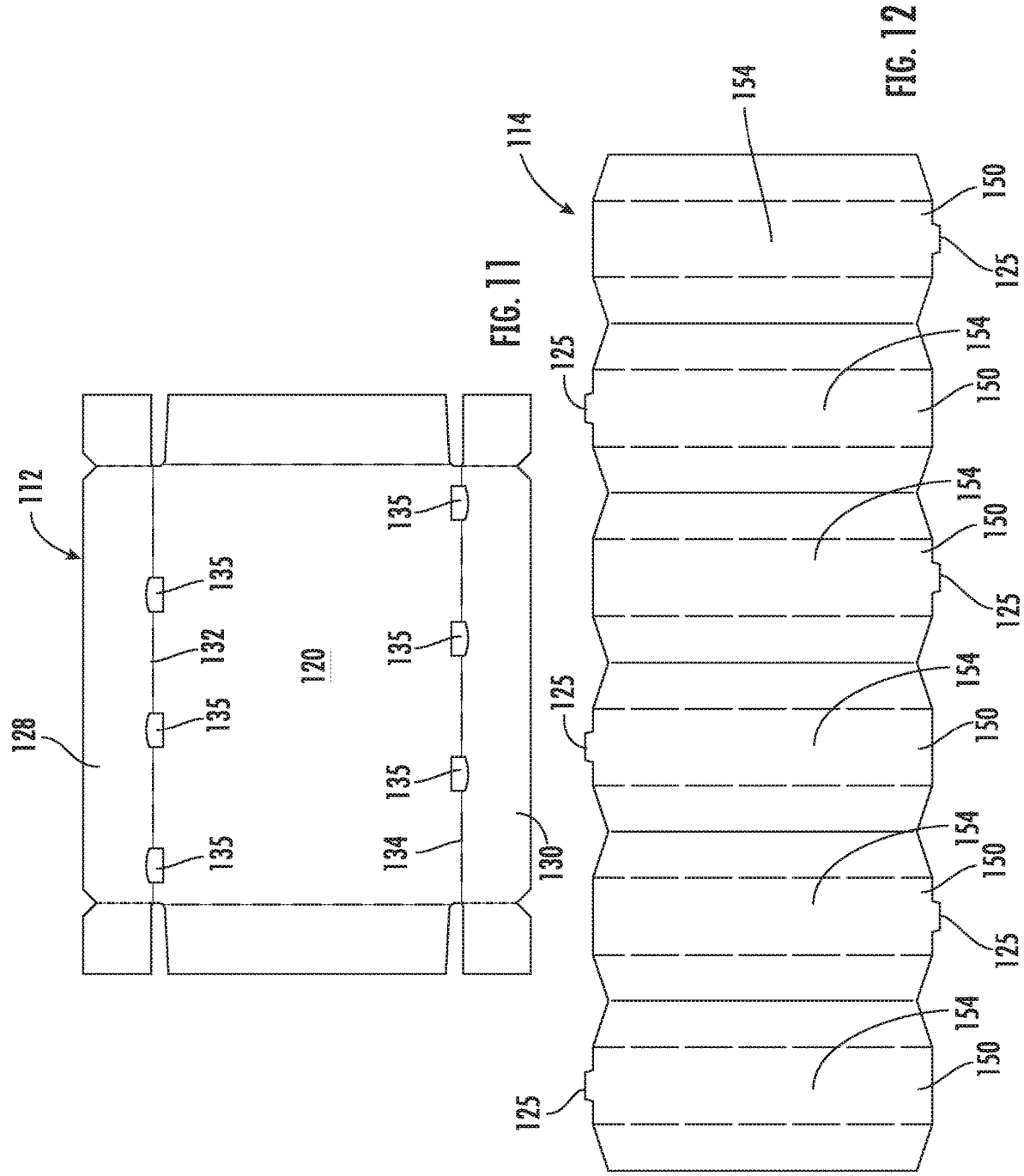

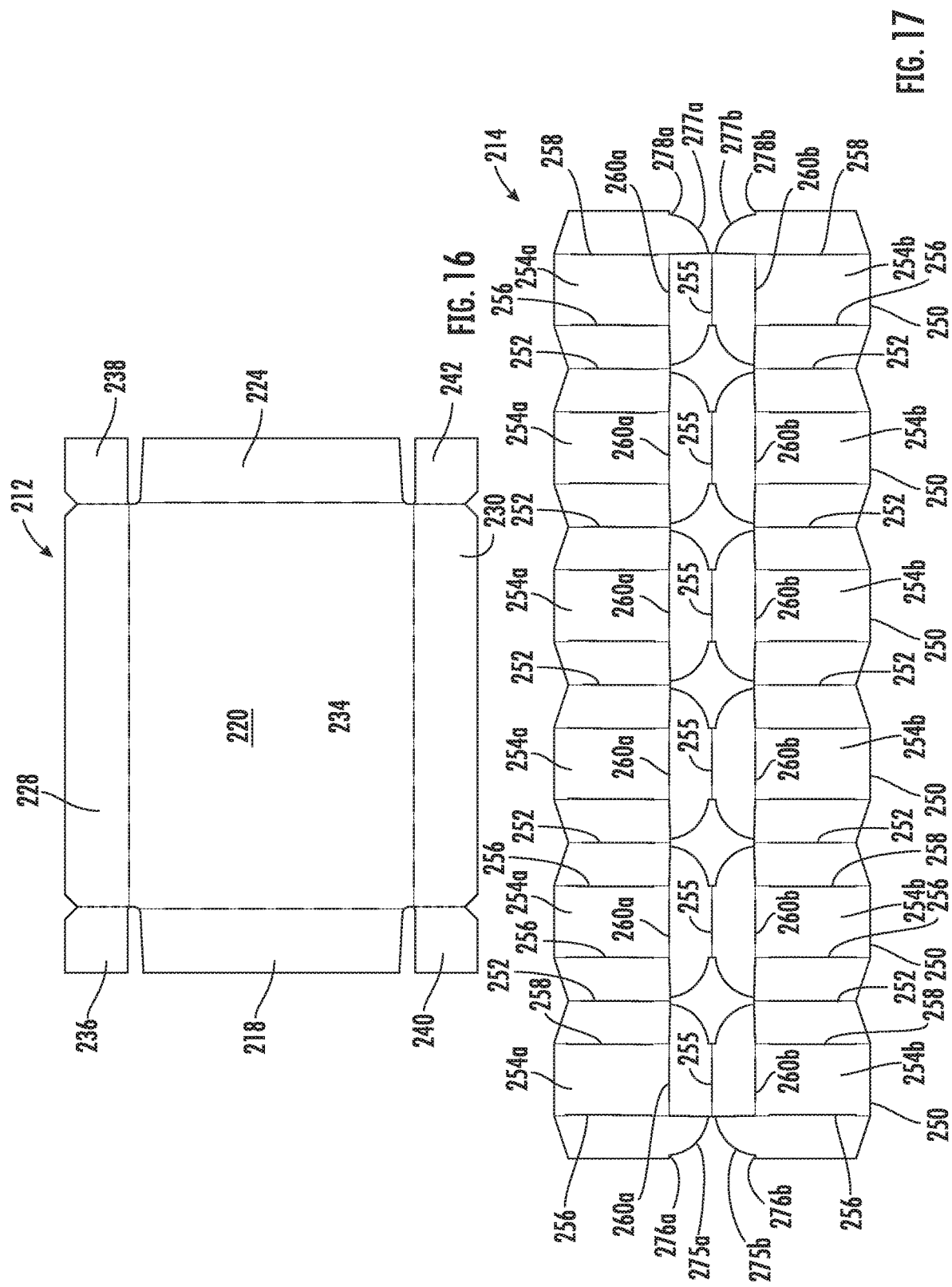

PACKAGE FOR DOUGH PRODUCTS INCLUDING A COLLAPSIBLE BAKING PAD

BACKGROUND OF THE INVENTION

1. Field of the Invention

The subject invention is directed to food packaging, and more particularly, to a package for shipping raw dough products on a collapsible pad that can be used for baking the dough products in an oven.

2. Description of Related Art

It is currently known to place raw dough products into large bags for bulk shipment. An end user must unpack the raw dough products from the bag, separate them from one another and orient the products on a cooking sheet before baking them in an oven. When the dough products are placed into bags, they can become deformed, resulting in baked products that are not aesthetically pleasing. Furthermore, it is a time consuming and arduous process to separate the dough products from one another and orient them on a baking sheet in a uniform manner so as to ensure consistency of the ultimate baked products.

It would be beneficial therefore to provide a package for shipping raw dough products in a way that protects them from deformation during shipping and which alleviates the time consuming task of separating and orienting the raw dough products on a sheet for baking.

The subject invention provides a novel solution by providing a package containing a collapsible baking pad supporting raw dough products that are already oriented thereon, and which can be easily removed from the package and expanded into a flattened condition for placement directly into an oven for baking.

SUMMARY OF THE DISCLOSURE

The subject invention is directed to a new and useful package for bulk shipping raw dough products that includes a tray defining an interior storage space, and a collapsible baking pad. The collapsible baking pad has an upper surface configured to support a plurality of raw dough products and is adapted for movement between a nested condition for placement within the interior storage space of the tray for shipping and a flattened condition separated from the tray for baking the raw dough products in an oven.

More particularly, in one embodiment of the subject invention, the collapsible baking pad has a longitudinal axis and is configured to move from the nested condition to the flattened condition by expanding the baking pad in a lengthwise direction relative to the longitudinal axis thereof. In another embodiment of the subject invention, the collapsible baking pad is configured to move from the nested condition to the flattened condition by expanding the baking pad in a lengthwise direction and a widthwise direction relative to the longitudinal axis thereof.

Preferably the tray is die cut from a containerboard packaging material, such as, for example, EnduraFlute™ packaging material, which is manufactured by WestRock Company, and the baking pad is die cut from an oven-ready polymer coated paperboard material, such as, for example, PolarSheild™ Ovenable packaging material, which is manufactured by WestRock Company. Other similar materials can also be used to make the tray and the baking pad of the subject invention.

The baking pad includes at least two conjoined sections divided by a medial fold line, wherein each of the conjoined sections includes a central surface area for supporting at least one dough product. The central surface area of each conjoined section of the baking pad is bounded by a pair of spaced apart lateral fold lines that extends parallel to one another and to the medial fold line dividing the two conjoined sections.

In an embodiment of the subject invention, the central surface area of each conjoined section of the baking pad is divided by a central crease line that extends perpendicular to the spaced apart lateral fold lines to divide each central surface area into a pair of spaced apart conjoined side surface areas, each for supporting a dough product. Each of the conjoined spaced apart side surface areas is bounded in part by a lateral crease line that extends parallel to the central crease line.

The tray includes a rectangular bottom panel, a front panel foldably attached to a front edge of the bottom panel, a rear panel foldably attached to a rear edge of the bottom panel, and two opposed side panels foldable attached to opposed side edges of the bottom panel.

In one embodiment of the package, a locking tab extends outwardly from a side edge of the central surface area of each conjoined section of the baking pad for engaging a complementary slot in a side edge of the tray to prevent the baking pad from moving around within the package during shipment. Preferably, the locking tabs on adjacent conjoined sections of the baking pad extend from opposite side edges of the baking pad.

These and other features of the food package of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those skilled in the art will readily understand how to make and use the food package of the subject invention without undue experimentation, preferred embodiments thereof will be described in detail herein below with reference to the figures wherein:

FIG. 2 is perspective view of the package illustrated in FIG. 1, with the front panel of the tray in an open condition and the baking pad separated from the tray in a collapsed nested condition;

FIG. 3 is perspective view of the package illustrated in FIG. 1, with the baking pad in a flattened condition separated from the tray;

FIG. 4 is a top plan view of the die cut blank for forming the tray of FIG. 3;

FIG. 5 is a top plan view of the die cut blank for forming the baking pad of FIG. 3;

FIG. 6 is a perspective view of the package illustrated in FIG. 1, with a side panel of the tray in an open condition and the baking pad separated from the tray in a collapsed nested condition;

FIG. 11 is a top plan view of the die cut blank for forming the tray of FIG. 10;

FIG. 12 is a top plan view of the die cut blank for forming the baking pad of FIG. 10;

FIG. 16 is a top plan view of the die cut blank for forming the tray of FIG. 14; and FIG. 17 is a top plan view of the die cut blank for forming the baking pad of FIG. 14.

DETAILED DESCRIPTION OF THE PREFERRED EMBODIMENTS

Figure 1:
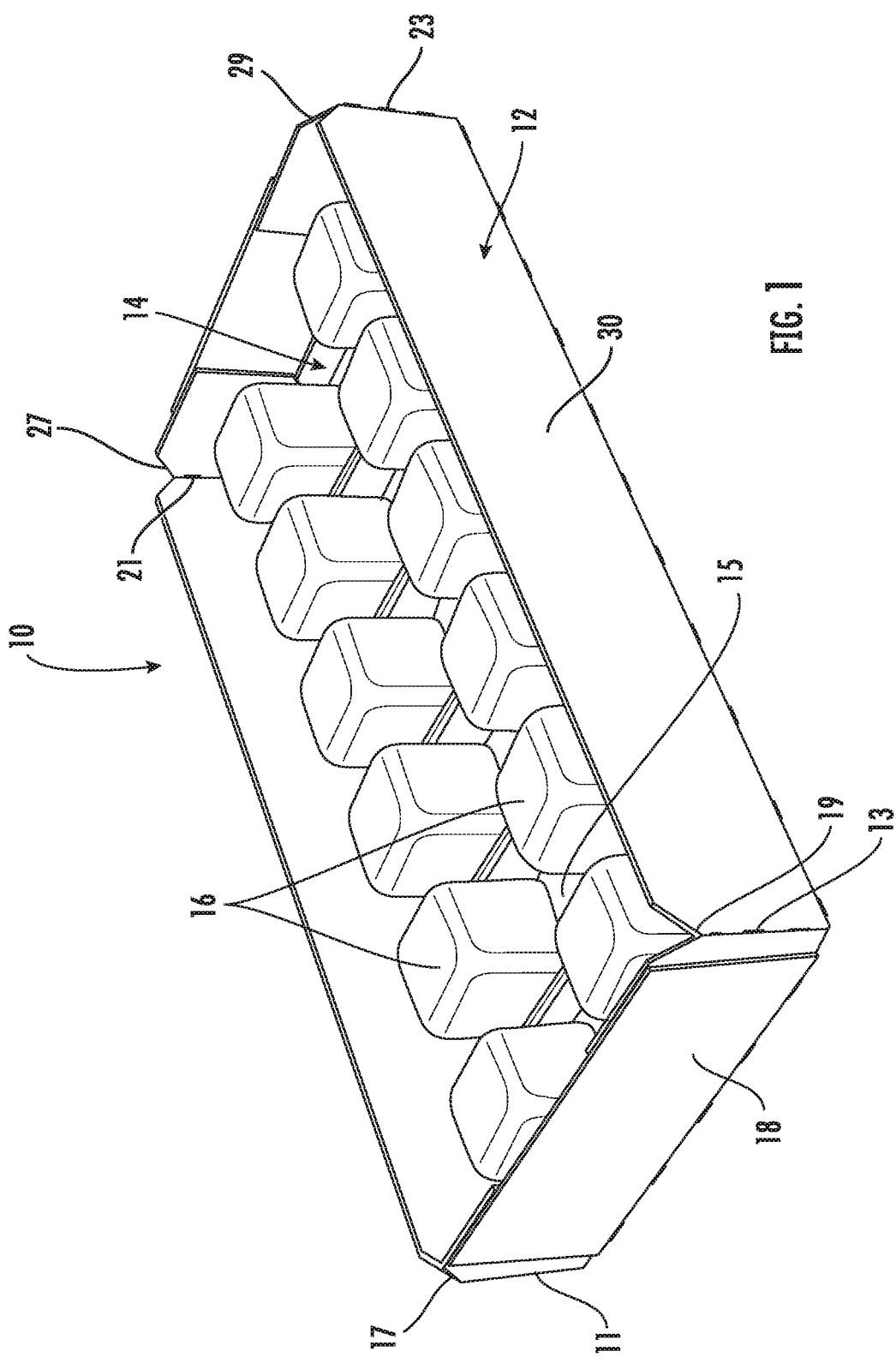
FIG. 1 is a perspective view an embodiment of the package of the subject invention, with the baking pad located within the tray in a collapsed nested condition.

Referring now to the drawings wherein like reference numerals identify similar structural elements of the various embodiments of the subject invention, there is illustrated in FIG. 1 a food package constructed in accordance with a preferred embodiment of the subject invention and designated generally by reference numeral 10. The food package 10 is adapted and configured for the bulk shipment of raw baking dough or bread dough in a compact and convenient manner.

Referring to FIG. 1, the food package 10 includes a generally rectangular tray 12 and a collapsible baking pad 14 nested within the tray 12 that is configured to support a plurality of raw dough products 16 to be used for baking. More particularly, when the baking pad 14 is collapsed and nested in the tray 12, pairs of dough products 16 occupy separate chambers 15 defined within the package 10. Furthermore, when the collapsible baking pad 14 is collapsed and nested within the tray 12, it reduces empty void space and material for bulk shipments.

Once it has been removed from the tray 12 by foldably opening the front panel 18, the collapsible baking pad 14 is adapted for movement between the nested condition shown in FIG. 2, collapsed within the interior storage space 20 of the tray 12 for shipping, and a flattened condition shown in FIG. 3, separated from the interior storage space 20 of the tray 12 for baking the dough products 16 supported thereon.

More particularly, a user can readily remove the collapsed baking pad 14 from the tray 12 by folding down the front panel 18 of the tray 12 and then sliding the collapsed baking pad 14 out of the tray 12, as shown in FIG. 2. This is done by tearing through the perforated, creased or cut score lines 11 and 13, which begin at the starter notches 17 and 19, respectively. These starter notches can be triangular or angled as shown, or they can be curved, rounded or otherwise configured to induce the tear. Alternatively, the rear panel 24 can be opened by tearing through the perforated, creased or cut score lines 21 and 23, which begin at the starter notches 27 and 29, respectively.

Once the collapsed baking pad 14 has been separated from the tray 12, the user can easily extend the baking pad 14 in a lengthwise direction into the flattened condition shown in FIG. 3, without dislodging or moving the baking products 16 supported thereon. Once the baking pad 14 has been extended in a lengthwise direction and flattened, the raw dough baking product 16 has room to expand as it is baked on the pad 14.

Preferably, the tray 12 is made from a containerboard packaging material, such as, for example, EnduraFlute™ packaging material, which is manufactured by WestRock Company. Alternative paperboard packaging materials may also be used to construct the tray 12. Preferably, the baking pad 14 is die cut from an oven-ready polymer coated paperboard material, such as, for example, PolarSheild™ Ovenable packaging material, which is manufactured by WestRock Company. In a preferred embodiment of the subject invention, the baking pad 14 has a material thickness of about 0.018 inches. Alternative oven-ready materials can be used to make the baking pad 14.

Referring now to FIG. 4, there is illustrated a die cut blank for forming the containerboard tray 12, which includes a rectangular bottom panel 20, a front panel 18 that is foldably attached to the bottom panel 20 along a front edge crease 22, a rear panel 24 that is foldably attached to the bottom panel 20 along a rear edge 26, and two opposed side panels 28 and 30 that are foldable attached to the bottom panel 20 along respective opposed side edge creases 32 and 34.

The edges creases 22, 26, 32 and 34 of tray 12 are preferably formed as gapped die cut lines that are readily foldable. The tray 12 further includes corner flaps 36 and 38 which depend from the opposed front and rear ends of side panel 28, and corner flaps 40 and 42 which depend from the opposed front and rear ends of side panel 30. The corner flaps generally provide surface area for applying an adhesive to construct the tray 12.

Referring to FIG. 5, there is illustrated the die cut paperboard baking pad 14 in an expanded and flattened condition, for ease of illustration. The baking pad 14 includes a plurality of identically configured conjoined sections 50, the number of which can vary from as few as two conjoined sections 50 to as many as six or more conjoined sections 50. Here, the baking pad 14 includes six conjoined sections 50, wherein adjacent conjoined sections 50 are divided or otherwise separated from one another by a medial fold line 52.

Each conjoined section 50 of baking 14 includes a central surface area 54 for supporting at least one raw dough product 16, and preferably at least two raw dough products 16, as shown for example in FIGS. 1 through 3. The central surface area 54 of each conjoined section 50 of the baking pad 14 is bounded by a pair of spaced apart lateral fold lines 56 and 58 that extend parallel to one another and to the medial fold line 52 dividing the two adjacent conjoined sections 50.

Lateral side regions 60 and 62 are defined on either side of the central surface area 54, each bounded by a medial fold line 52 and a respective lateral fold line 56 or 58. More specifically, each lateral side region 60 is bounded by a medial fold line 52 (or in the case of the left-most conjoined section 50, by the front edge line 52a) and a lateral fold line 56. Similarly, each lateral side region 62 is bounded by a medial fold line 52 (or in the case of the right-most conjoined section 50, by the rear edge line 52b) and a lateral fold line 58. Preferably, each medial fold line 52 is defined by a partial die cut line, and the lateral fold lines 56 and 58 are defined by perforated die cut lines that have cuts which are about ¾ of an inch in length separated by gaps which are about ⅛ of an inch in length.

The surface areas of the baking pad 14 defined between the lateral side regions 60 and 62 of adjacent conjoined sections 60 form the opposed side walls of each chamber 15, while the side panels 28 and 30 of tray 12 form the exterior walls of each chamber 15. As a result of this construction, when the baking pad 14 is in a collapsed nested condition within the tray 12 as shown in FIG. 1, two baking products 16 resides within each chamber 15, separated from the baking products 16 associated with an adjacent chamber 15 of food package 10.

Figure 7:
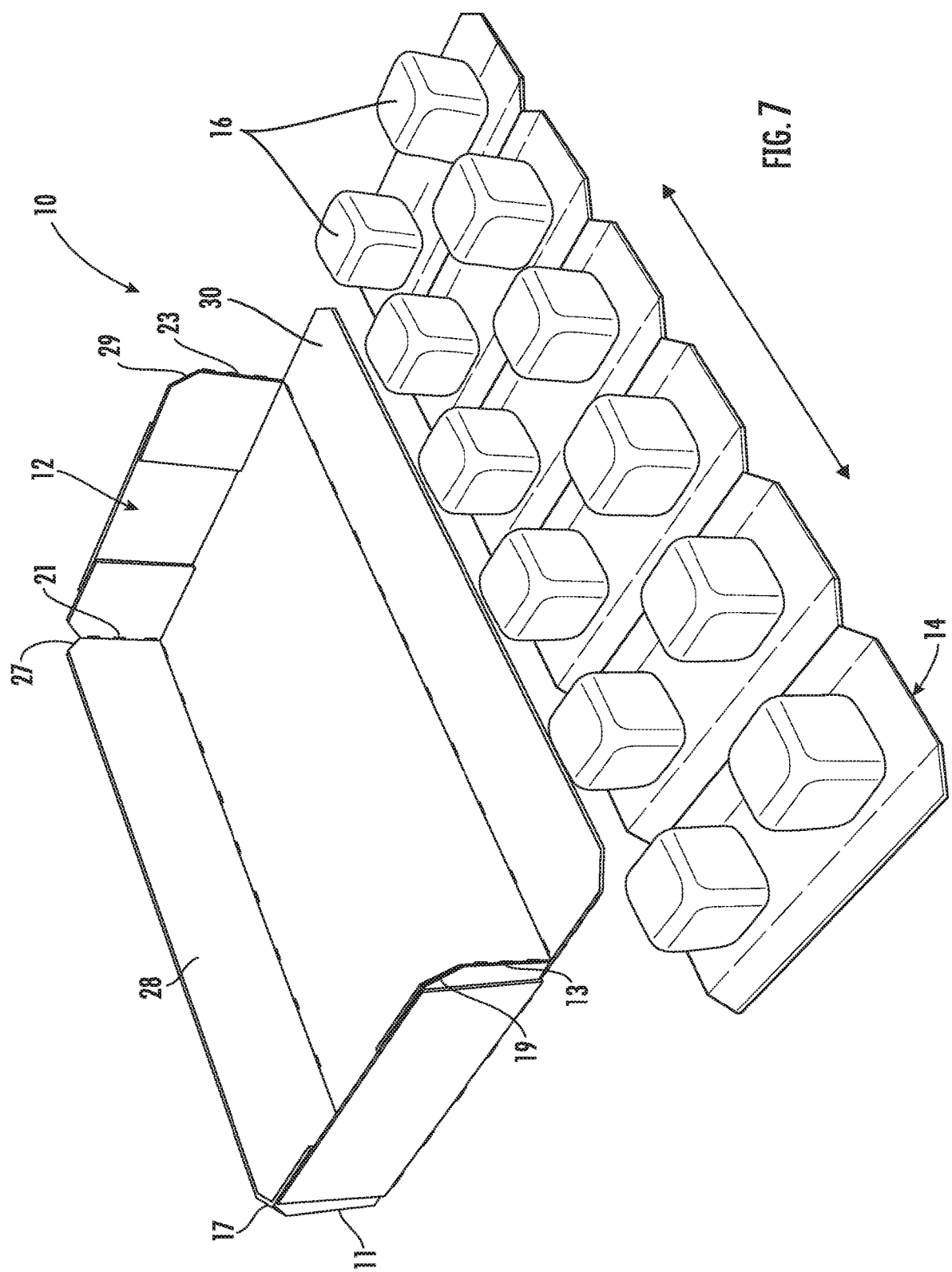
FIG. 7 is perspective view of the package illustrated in FIG. 6, with the baking pad in flattened condition separated from the tray.

Referring now to FIGS. 6 and 7, there is illustrated the food package 10 of the subject invention wherein the collapsible baking pad 14 can be readily removed from the tray 12 by foldably opening the side panel 30 of the tray 12, as opposed to the front panel 18 as previously illustrated in FIGS. 2 and 3. This is done by tearing through the perforated, creased or cut score lines 13 and 23, which begin at the starter notches 19 and 29, respectively. Alternatively, the rear panel 28 can be opened by tearing through the perforated, creased or cut score lines 11 and 21, which begin at the starter notches 17 and 27, respectively.

Once it has been removed from the tray 12 by foldably opening the side panel 30, the collapsible baking pad 14 is adapted for movement between the nested condition shown in FIG. 6 to the flattened condition shown in FIG. 7, without dislodging or moving the baking products 16 supported thereon. Once the baking pad 14 has been extended in a lengthwise direction and flattened, the raw dough baking product 16 has room to expand as it is baked on the pad 14.

Figure 8:
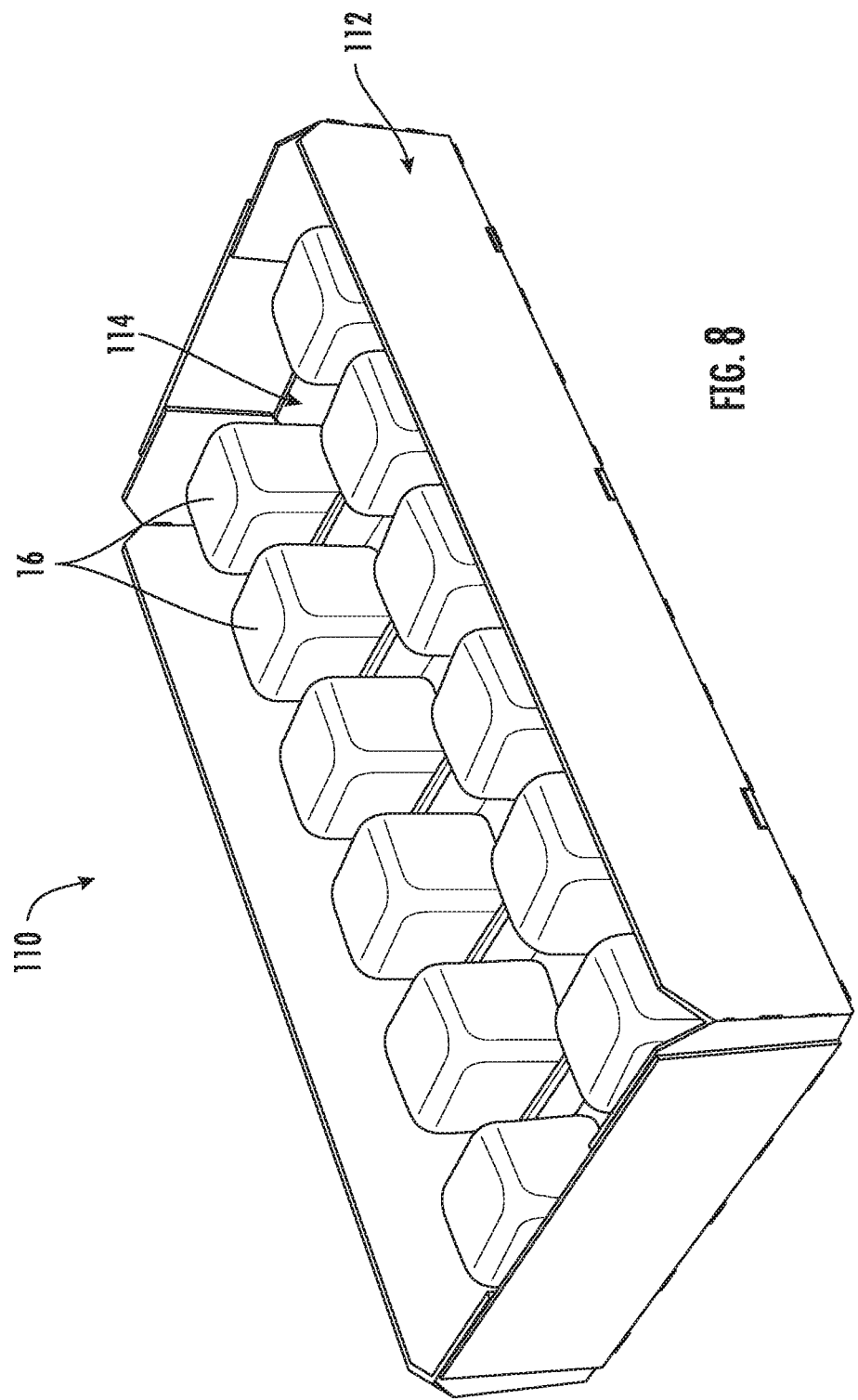
FIG. 8 is a perspective view yet another embodiment of the package of the subject invention, with the baking pad located within the tray in a collapsed nested condition.
Figure 9:
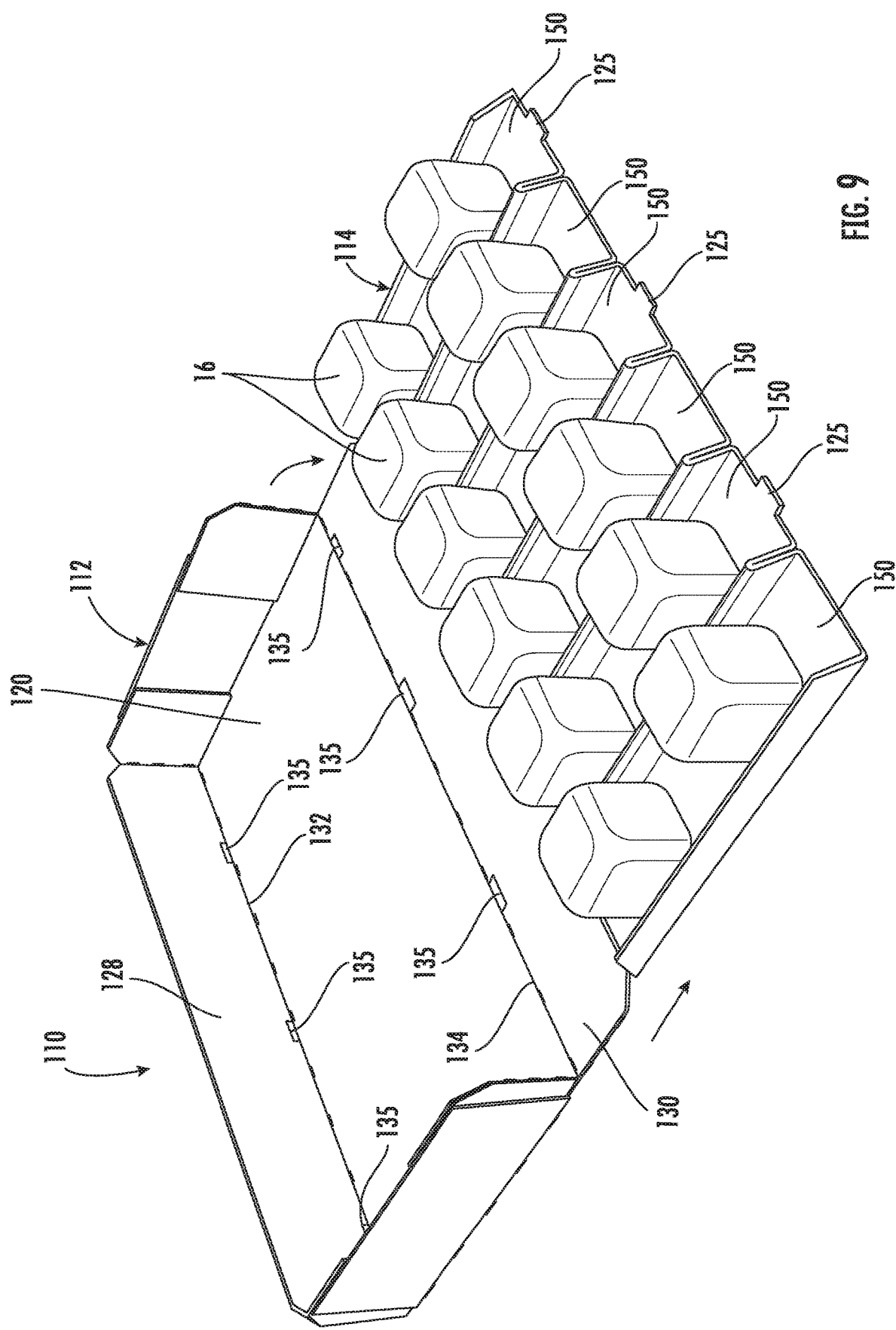
FIG. 9 is perspective view of the package illustrated in FIG. 8, with a side panel of the tray in an open condition and the baking pad separated from the tray in a collapsed nested condition.
Figure 10:
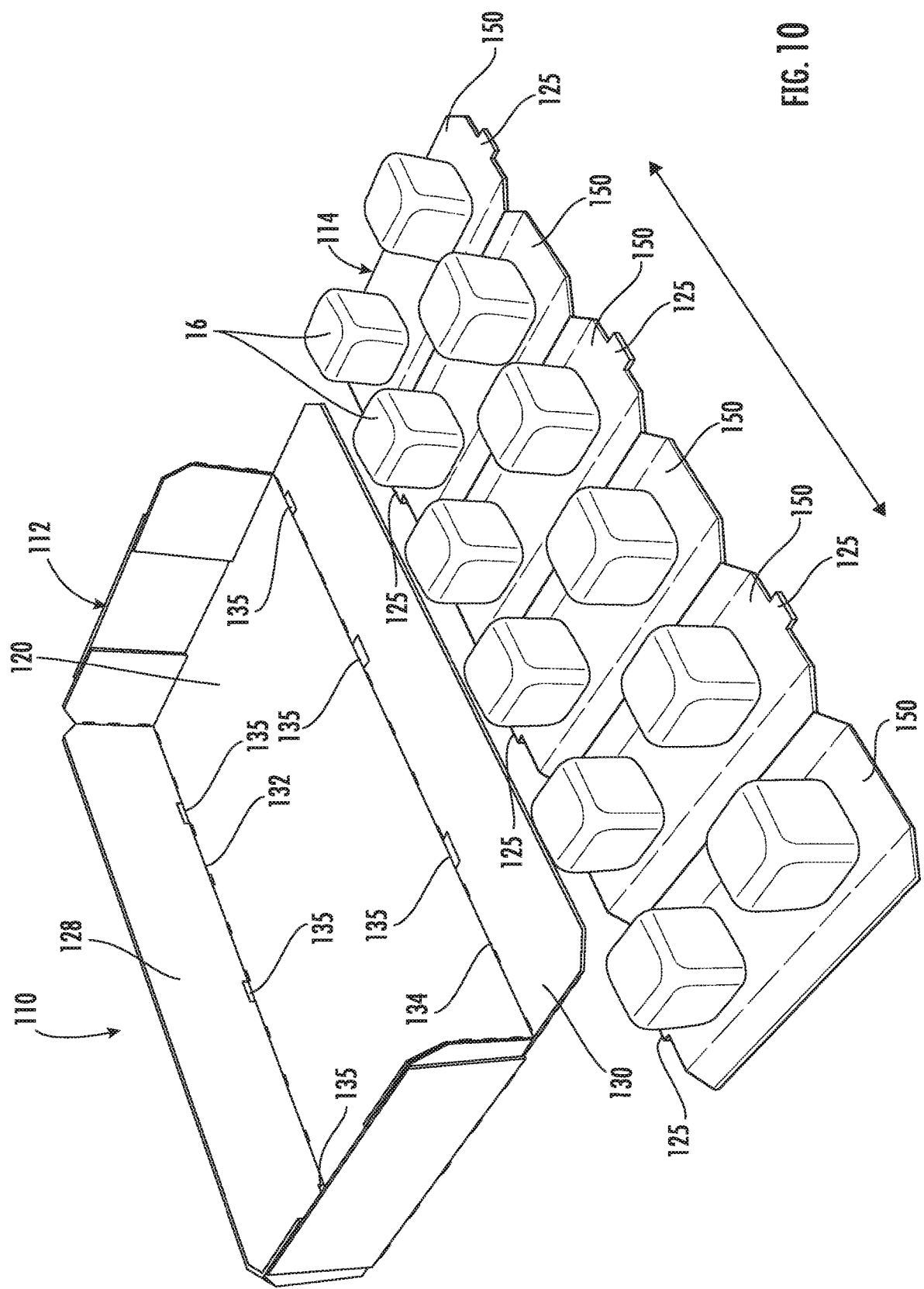
FIG. 10 is perspective view of the package illustrated in FIG. 8, with the baking pad in flattened condition separated from the tray.

Referring now to FIGS. 8 through 10, there is illustrated another embodiment of the food package of the subject invention, which is designated generally by reference numeral 110. Food package 110 is substantially identical to the food packages 10 illustrated in FIGS. 1 and 6, except that the baking pad 114 includes a plurality of locking tabs 125 for engaging a plurality of corresponding locking slots 135 formed in tray 112, to prevent the collapsed and nested baking pad 114 from moving or shifting within the tray 112 during shipment.

More particularly, as best seen in FIG. 12, the central surface area 154 of each conjoined sections 150 of baking pad 114 has a locking tab 125 that extends outwardly from a side edge thereof for engaging a corresponding locking slot 135 formed along the opposed side creases 132 and 134 that extend between the bottom panel 120 of tray 112 and the side panels 128 and 130, respectively, which is best seen in FIG. 11. Preferably, the locking tabs 125 on adjacent conjoined sections 150 of the baking pad 114 extend from opposite side edges of the baking pad 114, in an alternating pattern, so that there are an equal number of tabs 125 on each side of the baking pad 114.

Referring now to FIGS. 13 through 17, there is illustrated yet another embodiment of the food package of the subject invention, which is designated generally by reference numeral 210. Food package 210 is similar to food package 10 in that it includes a tray 212 having a front panel 218 that is configured to be foldably opened to access and remove the collapsed baking pad 214 nested within the interior space of the tray 212.

Figure 13:
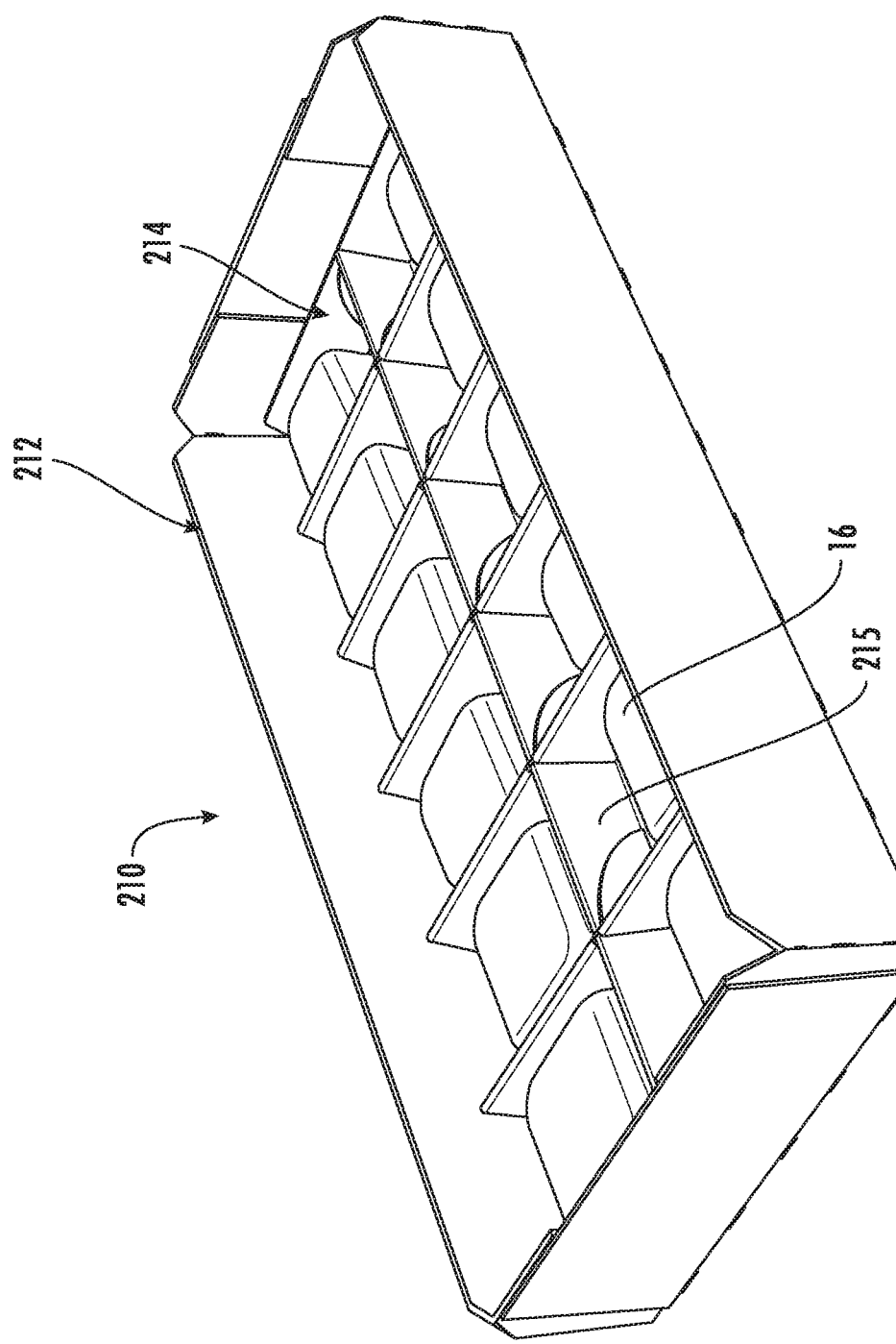
FIG. 13 is a perspective view yet another embodiment of the package of the subject invention, with the baking pad located within the tray in a collapsed nested condition.

The package 210 differs from each of the previously described packages in that the baking pad 214 is constructed to collapse in a lengthwise direction and in a widthwise direction, so as to further reduce the overall footprint of the package 210 for more convenient bulk shipping. Once it has been removed from the tray 212 by foldably opening the front panel 218, the collapsible baking pad 214 is adapted for movement between the nested condition shown in FIG. 14, to the flattened condition shown in FIG. 15, wherein the baking pad 114 is extended in its lengthwise and widthwise directions. When the collapsed baking pad 214 is in its nested condition within tray 212, each baking product 16 is separately situated in an individual chamber 215, as best seen in FIG. 13.

Referring to FIG. 16, the die cut blank for forming the tray 212 of food package 210 is substantially identical to the blank for the die cut tray 12 illustrated in FIG. 4, in that it includes a bottom panel 220, front panel 218, rear panel 224, opposed side panels 228 and 230, as well as corner flaps 236, 238, 240 and 242.

Figure 15:
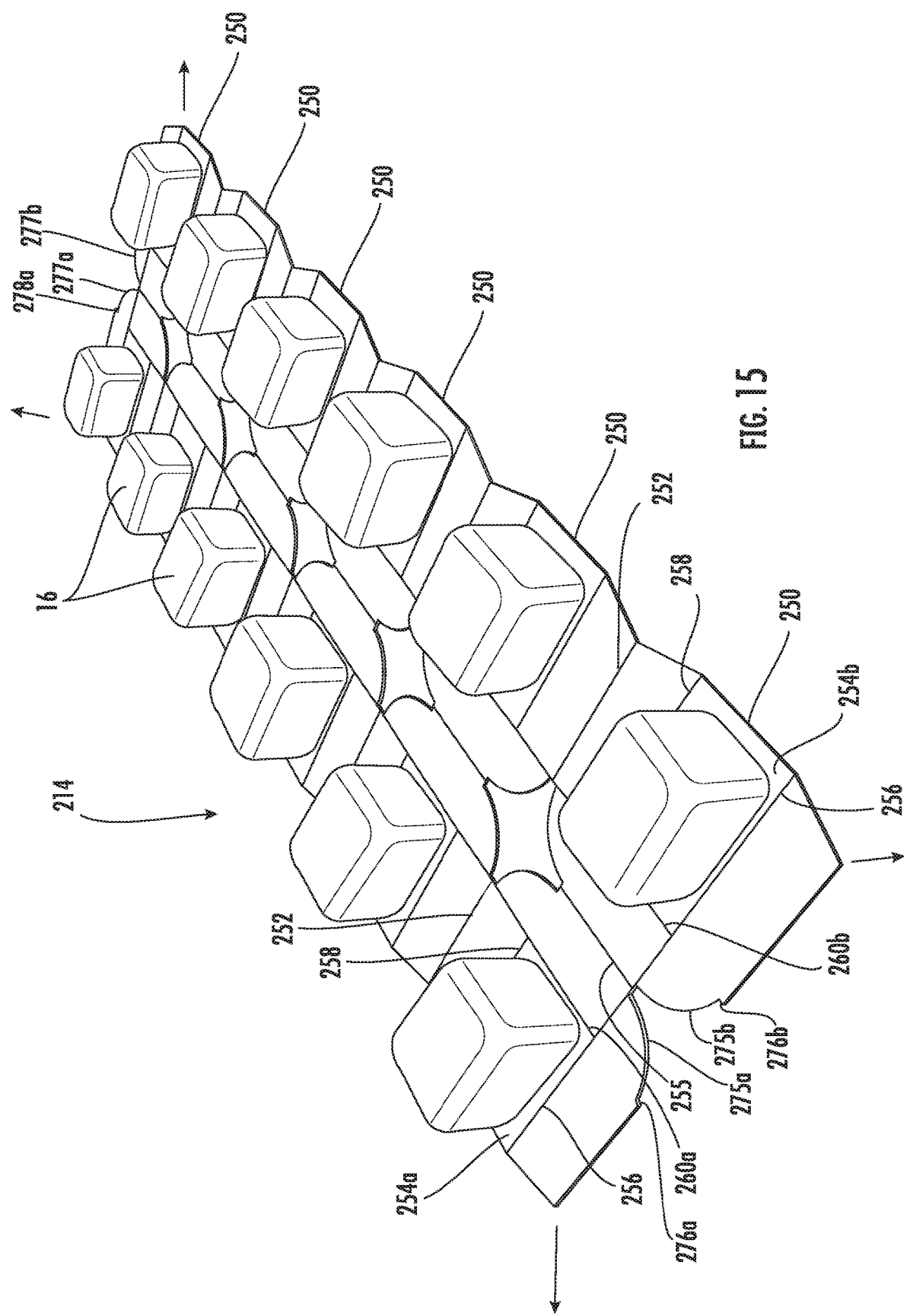
FIG. 15 is perspective view of the baking pad of FIG. 14, in flattened condition separated from the tray.

Turning now to FIG. 17, there is illustrated the die cut blank for forming the collapsible baking pad 214 of food package 210. As shown, the baking pad 214 includes a plurality of conjoined sections 250 each divided from one another by a disjointed medial fold line 252. Each conjoined section 250 is separated by a central perforated crease line 255 that extends along the central longitudinal axis of the backing pad 214. The central crease line 255 extends perpendicular to the spaced apart perforated lateral fold lines 256 and 258 on each conjoined section 250. The central crease line 255 subdivides each conjoined section 250 into a pair of equally sized and shaped spaced apart side surface areas 254a and 254b, each for supporting at least one dough product 16, as best seen in FIG. 15. In addition, each side surface areas 254a is bounded in part by a lateral crease line 260a that extends parallel to the central crease line 255, and each side surface area 254b is bounded in part by a lateral crease line 260b that extends parallel to the central crease line 255.

The surface areas of the baking pad 214 defined between the central crease line 255 and the lateral crease lines 260a and 260b of adjacent conjoined side surface areas 254a and 254b form the inner wall of each chamber 215, and the surface areas of the baking pad 214 defined between the medial fold lines 252 and the lateral fold lines 256 and 258 of adjacent conjoined sections 250 form opposed side walls of each chamber 215, while the side panels 228 and 230 form exterior walls of each chamber 215. As a result of this construction, when the baking pad 214 is in a nested condition with the tray 212 as shown in FIG. 13, each baking product 16 resides within its own individual chamber 215, completely separated from the adjacent baking products 16.

Figure 14:
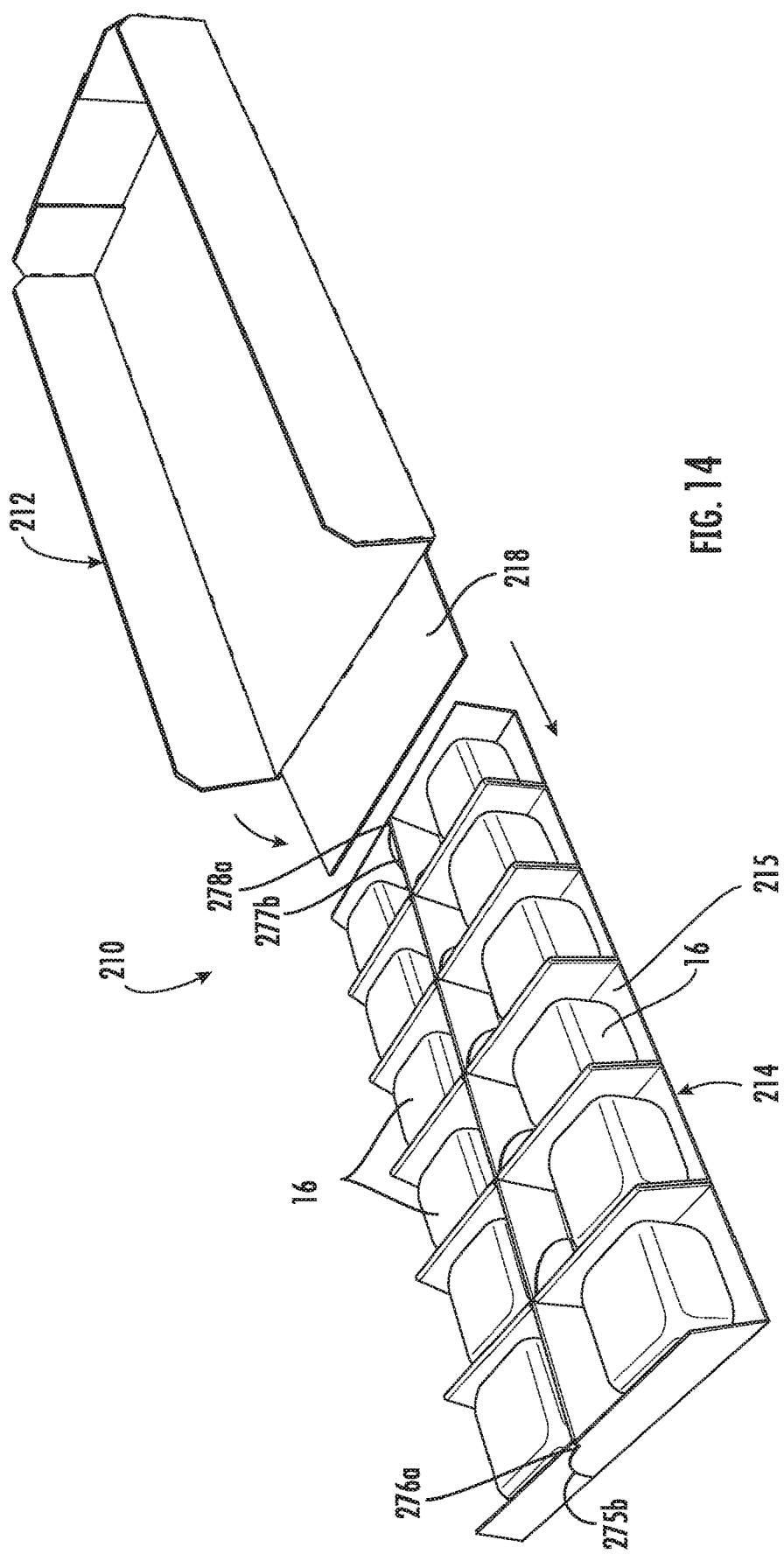
FIG. 14 is perspective view of the package illustrated in FIG. 13, with the front panel of the tray in an open condition and the baking pad separated from the tray in a collapsed nested condition.

With continuing reference to FIGS. 15 and 17, the die cut blank for forming baking pad 214 incudes structure for maintaining the baking pad 214 in its nested condition. In particular, the leading edge of the baking pad 214 includes arcuate tabs 275a and 275b with respective keeper notches 276a and 276b, and the trailing edge of baking pad 214 includes arcuate tabs 277a and 277b with respective keeper notches 278a and 278b. When the baking pad 214 is in a nested condition, as shown in FIG. 14, the adjacent arcuate tabs and keeper notches on the leading and trailing edges of the baking pad 214, intermesh with one another and advantageously lock together to maintain the baking pad 214 in its nested condition. Similar features throughout the central region of the baking pad provide further structural support in the nested condition.

While the subject disclosure has been shown and described with reference to preferred embodiments, those skilled in the art will readily appreciate that changes or modifications may be made thereto without departing from the spirit or scope of the subject disclosure.

What is claimed is:

1. A package for dough products, comprising:
a) a tray defining an interior storage space;
b) a collapsible baking pad disposed within the interior storage space of the tray in an initial nested condition for shipping, said collapsible baking pad having an upper surface supporting a plurality of dough products, said collapsible baking pad being adapted for movement from said initial nested condition to a flattened condition separated from the tray for baking the plurality of dough products supported thereon;
wherein the baking pad includes at least two conjoined sections divided by a medial fold line, each of the sections including a central surface area supporting at least one dough product of the plurality of dough products;
wherein the central surface area of each section of the baking pad is bounded by a pair of spaced apart lateral fold lines extending parallel to one another and to the medial fold line dividing the two conjoined sections;
wherein the central surface area of each section of the baking pad is divided by a central crease line that extends perpendicular to the spaced apart lateral fold lines to divide each central surface area into a pair of spaced apart conjoined side surface areas, each supporting a dough product of the plurality of dough products; and
wherein the each of the spaced apart side surface areas is bounded in part by a lateral crease line that extends parallel to the central crease line.

2. A package as recited in claim 1, wherein the tray includes a rectangular bottom panel, a front panel foldably attached to a front edge of the bottom panel, a rear panel foldably attached to a rear edge of the bottom panel, and two opposed side panels foldable attached to opposed side edges of the bottom panel.

3. A package as recited in claim 1, wherein the baking pad is made from an oven-ready polymer coated paperboard material, and the tray is made from containerboard packaging material.

4. A package as recited in claim 1, wherein the collapsible baking pad has a longitudinal axis and is adapted to move from the nested condition to the flattened condition by expanding the baking pad in a lengthwise direction relative to the longitudinal axis thereof.

5. A package as recited in claim 1, wherein the collapsible baking pad has a longitudinal axis and is adapted to move from the nested condition to the flattened condition by expanding the baking pad in a lengthwise direction and a widthwise direction relative to the longitudinal axis thereof.

* * * * *